United States Patent [19]

Knorre et al.

[11] 4,124,406
[45] * Nov. 7, 1978

[54] SETTING RETARDER

[75] Inventors: Helmut Knorre, Seligenstadt; Manfred Langer, Hanau; Wolfgang Fischer, Kahl, all of Germany

[73] Assignee: Deutsche Gold und-Silber-Scheideanstalt vormals Roessler, Frankfurt, Germany

[ * ] Notice: The portion of the term of this patent subsequent to Jun. 13, 1995, has been disclaimed.

[21] Appl. No.: 723,174

[22] Filed: Sep. 14, 1976

[30] Foreign Application Priority Data

Sep. 24, 1975 [DE] Fed. Rep. of Germany ....... 2542536

[51] Int. Cl.² ............................................. C04B 11/14
[52] U.S. Cl. ..................................... 106/111; 106/315
[58] Field of Search ............... 106/111, 112, 113, 114, 106/115, 116, 315

[56] References Cited

U.S. PATENT DOCUMENTS

| 169,212 | 10/1975 | Warwick | 106/111 |
|---|---|---|---|
| 392,481 | 11/1888 | Williams | 106/111 |
| 422,269 | 2/1890 | West | 106/315 |
| 449,653 | 4/1891 | Abell | 106/111 |
| 2,508,480 | 5/1950 | Ainsworth | 106/111 |

FOREIGN PATENT DOCUMENTS 582,505 11/1946 United Kingdom.

OTHER PUBLICATIONS

"Hackh's Chemical Dictionary", McGraw-Hill Book Co., 1969, 4th ed., pp. 420, 567 and 637.

Primary Examiner—L. Dewayne Rutledge
Assistant Examiner—John P. Sheehan
Attorney, Agent, or Firm—Cushaman, Darby & Cushman

[57] ABSTRACT

Gypsum plaster having a delayed setting time is made by adding a mixture of mesotartaric acid and l-tartaric acid or d,l-tartaric acid or a mixture of l-tartaric acid and d,l-tartaric acid to the gypsum plaster.

8 Claims, No Drawings

SETTING RETARDER

BACKGROUND OF THE INVENTION

Gypsum plasters (plaster of Paris) have been known for a long time and because of their easy workability are desired construction materials for piecework and dressing operations in the plaster field. Besides they have been used for artistic and medicinal patterns as well as, following the recent trends, for prefabricated parts. This versatile inclusion in many areas of use is only possible if the neutral setting properties of the gypsum plaster are so changed that the necessary working time is attained. Thus, for example, workers of plaster gypsum for mechanical casting require that the so-called commencement of stiffening of the gypsum plaster first begin 30 to 60 minutes after the mechanical mixing and applying of the gypsum plaster and that subsequently there remains about an equal time in which the gypsum plaster is still shapable and can be smoothed on the wall. On the contrary, in other processes it is desired that the commencement of stiffening of the gypsum plaster be very long drawn out but that the termination of setting occurs a short time thereafter, see Ullmann, Vol. 8, 3rd edition, pages 97 et seq.

To a limited extent this setting characteristic of the gypsum plaster can be regulated by a modification of the process of production in reference to crystal structure and particle size. In most cases, however, one is dependent upon the addition of so-called setting regulators. They acted in different ways, for the most part very complexly in the setting mechanism. Thus, for example, alcohols and lower fatty acids act as retarders in which they lower the solubility of the anhydrite phases of the gypsum plaster. Other materials, as for example phosphates, produce a film forming precipitate on the $CaSO_4$ particles which greatly lower the speed of solution of the plaster in the mixing water.

The effectiveness of a large number of commercial setting retarders is in that they act as nucleation inhibitors for the calcium sulfate dihydrate. Also the complexing of the calcium ion plays a certain part in the setting process. Therefore, likewise, a setting retardation of the gypsum plaster can be produced with typical chelate-complex formus such as, for example, diethylenetriamine pentaacetic acid or dicarboxylic acids or polyhydroxy carboxylics. In spite of the numerous systems investigated, however, it is still practically impossible today to be able to conclude from the structure of a chemical compound its effectiveness and ability to be included as a setting regulator, see E. Graf and F. Rausch, Zement-, Kalk-Gips, Vol. 4, page 117 et seq. (1951). It is known that l-tartaric acid causes a clear setting retardation in gypsum plaster even when used in small amounts from 0.01 weight % (based on the weight of the plaster). L-tartaric acid must be regarded as one of the best retarders since good gradation in the retardation value can be obtained with it depending on the amount employed. Besides it shows no undesired effects on strength, adhesive power and expansion properties. According to Knorre German application No. P 2542535.8 filed Sept. 24, 1975 and the corresponding Knorre et al U.S. application Ser. No. 723,173 filed Sept. 14, 1976 entitled "Gypsum Plaster" now U.S. Pat. No. 4,094,693 d, l-tartaric acid (racemic tartaric acid) also shows these good properties as a gypsum aid. The entire disclosure of the Knorre U.S. application is hereby incorporated by reference and relied upon.

To be sure there are situations in which l- or d,l-tartaric acid until now could not be added as setting retarders because they lead to overlong setting times with several gypsums or because with other gypsum plasters the typically long retardation of the final phase of the setting process for tartaric acid is undesired.

In further types of gypsum, namely mechanical plaster gypsum, a still further increase in the effectiveness of tartaric acid as a setting retarder is desired.

SUMMARY OF THE INVENTION

The purpose of the present application is the development of setting retarders which also lead to desired setting times with gypsum plasters of the previously named types.

It has now been found that meso-tartaric acid in admixture with l-tartaric acid or d,l-tartaric acid or mixtures of both l- and d,l-tartaric acids as setting regulator brings about the desired effect in all of the above-mentioned types of gypsum. Especially favorable is a mixture of meso-tartaric acid with d,l-tartaric acid.

This is surprising since our own experiments have shown that meso-tartaric acid alone as a setting retarder has a better setting retardation for current industrial plaster than other fruit acids, as for example citric acid, but its effectiveness is clearly less than l-tartaric acid or d,l-tartaric acid and therefore in comparison to these is uneconomical.

In the setting retarders of the invention meso-tartaric acid should be present in an amount of 5 to 80%, preferably 20 to 60 weight %, based on the total of all the various tartaric acids employed. The setting regulators are ordinarily added in an amount of 0.01 to 0.5 weight %, preferably 0.015 to 0.2 weight %, based on the gypsum plaster.

With these setting retarders therefore, gypsum plasters can be regulated to customary industrial setting times, even though because of their mineralogical origin, their process of production or their packaging, for example with lime gypsum plasters, they react with the least amount of tartaric acid additives with overlong retardation times and with great variations of the same, see Example 1.

Furthermore, through the setting retarders of the invention the relationship of the end of the stiffening to the beginning of the stiffening is favorably influenced without impairing the initial retardation, see Examples 2 and 3.

In the case of special high fired anhydrite plasters, as they are used by different manufacturers, especially for manufacture of mechanical plaster gypsum, the additives of the invention effect considerably longer setting times than the addition of an equal amount of l- or d,l-tartaric or meso-tartaric acid alone. Thereby the setting retarder must be used in such an amount that in the ready-made gypsum plaster at least 0.04 weight % of l- or d,l -tartaric acid or a mixture of both is used.

It has proven favorable to employ additive amounts of at least 0.06 weight % of the plaster, with at least 50% of l- or d,l-tartaric acid or a mixture of both of these based on all of the tartaric acids.

For the production of such setting retarders there can also be used solutions or evaporation mixtures from synthetic tartaric acid processes which contain mixtures of d,l-tartaric acid and meso-tartaric acid, see Prescher German patent application No. P 2508228.4-42 and related Prescher U.S. application Ser. No. 656,591 filed Feb. 9, 1976. The entire disclosure of the Prescher U.S.

application is hereby incorporated by reference and relied upon.

The particle size distribution of the tartaric acids added as setting retarders desirably are to a large extent below 200μ, preferably more than 95% are below 200μ.

In this manner there is guaranteed a good mixture of the dry setting retarders with the gypsum plaster and the avoidance of a local too high concentration of tartaric acid, which can lead to a local reduction of the pH.

With the use of d,l-tartaric acid as the mixing partner there should be present in the gypsum plaster such an amount of calcium hydroxide that the pH value of a 5% aqueous paste is at least 11.5, preferably at least 12.00 up to the pH of a saturated solution of calcium hydroxide.

The invention will be further explained in connection with the following examples.

Unless otherwise indicated, all parts and percentages are by weight.

The compositions can comprise, consist essentially of, or consist of the materials set forth.

DECRIPTION OF THE PREFERRED EMBODIMENTS

The measurements of setting characteristics took place with the Vicat-plonger cone according to DIN (German Industrial Standard) 1168.

EXAMPLE 1

Lime Plaster Gypsum Composition

| $CaSO_4$ | 6.5% |
| $CaSO_4 \cdot \frac{1}{2}H_2O$ | 48.3% |
| $CaCO_3$ | 35.5% |
| $Ca(OH)_2$ | 6.4% |
| Insolubles | 2.4% |
| Sesquioxides not estimated | |
| pH of a 5% paste in water | 12.7 |

| Water-Gypsum Ratio | Slump Measurement (mm) | Additive % | Retarder | Stiffening Beginning (Minutes) | End |
|---|---|---|---|---|---|
| 0.380 | 161 | 0.015 | d,l-tartaric acid | 90 | 370 |
| 0.380 | 159 | 0.015 | l-tartaric acid | 100 | 380 |
| 0.380 | 160 | 0.015 | (meso-tartaric (acid 60% (d,l-tartaric (acid 40% | 50 | 130 |
| 0.380 | 160 | 0.015 | (meso-tartaric (acid 40% (d,l-tartaric (acid 60% | 65 | 180 |

EXAMPLE 2

Finished Mortar Gypsum Composition

| $CaSO_4$ | 3.8% |
| $CaSO_4 \cdot \frac{1}{2}H_2O$ | 77.3% |
| $MgCO_3$ | 3.7% |
| $CaCO_3$ | 2.3% |
| $Ca(OH)_2$ | 3.9% |
| Insolubles | 4.5% |
| pH of a 5% paste in water | 12.6 |
| Sesquioxides not estimated | |

| Water-Gypsum Ratio | Slump Measurement (mm) | Additive % | Retarded | Stiffening Beginning (Minutes) | End |
|---|---|---|---|---|---|
| 0.720 | 164 | 0.06 | l-tartaric acid | 52 | 98 |
| 0.716 | 164 | 0.06 | (meso-tartaric (acid 33% (d,l-tartaric (acid 67% | 56 | 69 |

EXAMPLE 3

Finished Mortar Gypsum Composition

| $CaSO_4$ | 2.6% |
| $CaSO_4 \cdot \frac{1}{2}H_2O$ | 80.4% |
| $MgCO_3$ | 4.8% |
| $CaCO_3$ | 3.2% |
| $Ca(OH)_2$ | 1.0% |
| Insolubles | 5.7% |
| pH of a 5% paste in water | 12.0 |
| Sesquioxides not estimated | |

| Water-Gypsum Ratio | Slump Measurement (mm) | Additive % | Retarder | Stiffening Beginning (Minutes) | End |
|---|---|---|---|---|---|
| 0.640 | 164 | 0.05 | l-tartaric | 100 | 175 |
| 0.660 | 173 | 0.05 | (meso-tartaric (acid 47% (d,l-tartaric (acid 53% | 85 | 100 |
| 0.640 | 165 | 0.07 | l-tartaric acid | 125 | 230 |
| 0.650 | 161 | 0.07 | (meso-tartaric (acid 47% (d,l-tartaric (acid 53% | 120 | 175 |

EXAMPLE 4

Plaster Gypsum for Mechanical Casting

| $CaSO_4$ | 52.5% |
| $CaSO_4 \cdot \frac{1}{2}H_2O$ | 29.6% |
| $MgCO_3$ | 4.0% |
| $CaCO_3$ | 4.2% |
| $Ca(OH)_2$ | 1.9% |
| Insolubles | 6.9% |
| Sesquioxides not estimated | |
| pH of a 5% paste in water | 12.2 |

| Water-Gypsum Ratio | Slump Measurement (mm) | Additive % | Retarder | Stiffening Beginning (Minutes) | End |
|---|---|---|---|---|---|
| 0.434 | 169 | 0.1 | l-tartaric acid | 59 | 100 |
| 0.427 | 167 | 0.1 | d,l-tartaric acid | 58 | 98 |
| 0.427 | 170 | 0.1 | (meso-tartaric (acid 35% (d,l-tartaric (acid 65% | 93 | 155 |
| 0.427 | 170 | 0.1 | (meso-tartaric (acid 47% (d,l-tartaric (acid 53% | 106 | 185 |
| 0.427 | 165 | 0.1 | (meso-tartaric (acid 55% (d,l-tartaric (acid 45% | 75 | 118 |

EXAMPLE 5

Plaster Gypsum for mechanical casting

| $CaSO_4$ | 38.9% |
| $CaSO_4 \cdot \frac{1}{2}H_2O$ | 32.7% |
| $MgCO_3$ | 6.1% |
| $CaCO_3$ | 8.3% |
| $Ca(OH)_2$ | 2.4% |
| Insolubles | 8.3% |
| pH of a 5% paste in water | 12.3 |
| Sesquioxides not estimated | |

| Water-Gypsum Ratio | Slump Measurement (mm) | Additive % | Retarder | Stiffening Beginning (Minutes) | End |
|---|---|---|---|---|---|
| 0.448 | 162 | 0.06 | l-tartaric | 70 | 125 |

-continued

| | | | acid | | |
|---|---|---|---|---|---|
| 0.448 | 158 | 0.08 | l-tartaric acid | 75 | 135 |
| 0.448 | 162 | 0.10 | l-tartaric acid | 90 | 155 |
| 0.448 | 160 | 0.15 | l-tartaric acid | 130 | 240 |
| 0.448 | 161 | 0.06 | (meso-tartaric acid 40% (d,l-tartaric acid 60% | 75 | 130 |
| 0.448 | 162 | 0.08 | " | 95 | 190 |
| 0.448 | 160 | 0.10 | " | 110 | 215 |
| 0.448 | 162 | 0.15 | " | 170 | 320 |

What is claimed is:

1. Gypsum plaster having a mixture of tartaric acids therein to delay the setting time of the plaster, said tartaric acids consisting of a mixture of meso-tartaric acid with (1) l-tartaric acid, (2) d,l-tartaric acid or (3) both of l-tartaric acid and d,l-tartaric acid, said mixture of tartaric acids containing 5 to 80% of meso-tartaric acid by weight, said plaster containing 0.01 to 0.5% by weight of said mixture of tartaric acids, and when said mixture of tartaric acids is (2) or (3) the plaster has sufficient calcium hydroxide that a 5% aqueous paste of the plaster has a pH of at least 11.5.

2. Gypsum plaster according to claim 1 wherein said mixture of tartaric acids contains 20 to 60% of meso-tartatic acid.

3. Gypsum plaster according to claim 1 wherein the plaster contains 0.015 to 0.2% of said mixture of tartaric acids.

4. Gypsum plaster according to claim 3 wherein the plaster has sufficient calcium hydroxide that a 5% aqueous paste of the plaster has a pH of 12 up to the pH of saturated calcium hydroxide.

5. Gypsum plaster according to claim 1 wherein the plaster has sufficient calcium hydroxide that a 5% aqueous paste of the plaster has a pH of 12 up to the pH of saturated calcium hydroxide.

6. Gypsum plaster according to claim 1 wherein the plaster has sufficient calcium hydroxide that a 5% aqueous paste of the plaster has a pH of at least 11.5.

7. Gypsum plaster according to claim 6 wherein the mixture of tartaric acids consists of a mixture of meso-tartaric acid with either (1) d,l-tartaric acid or (2) both l-tartaric acid and d,l-tartaric acid.

8. Gypsum plaster according to claim 1 wherein the mixture of tartaric acids consists of a mixture of meso-tartaric acid and l-tartaric acid.

* * * * *